Figure 1:
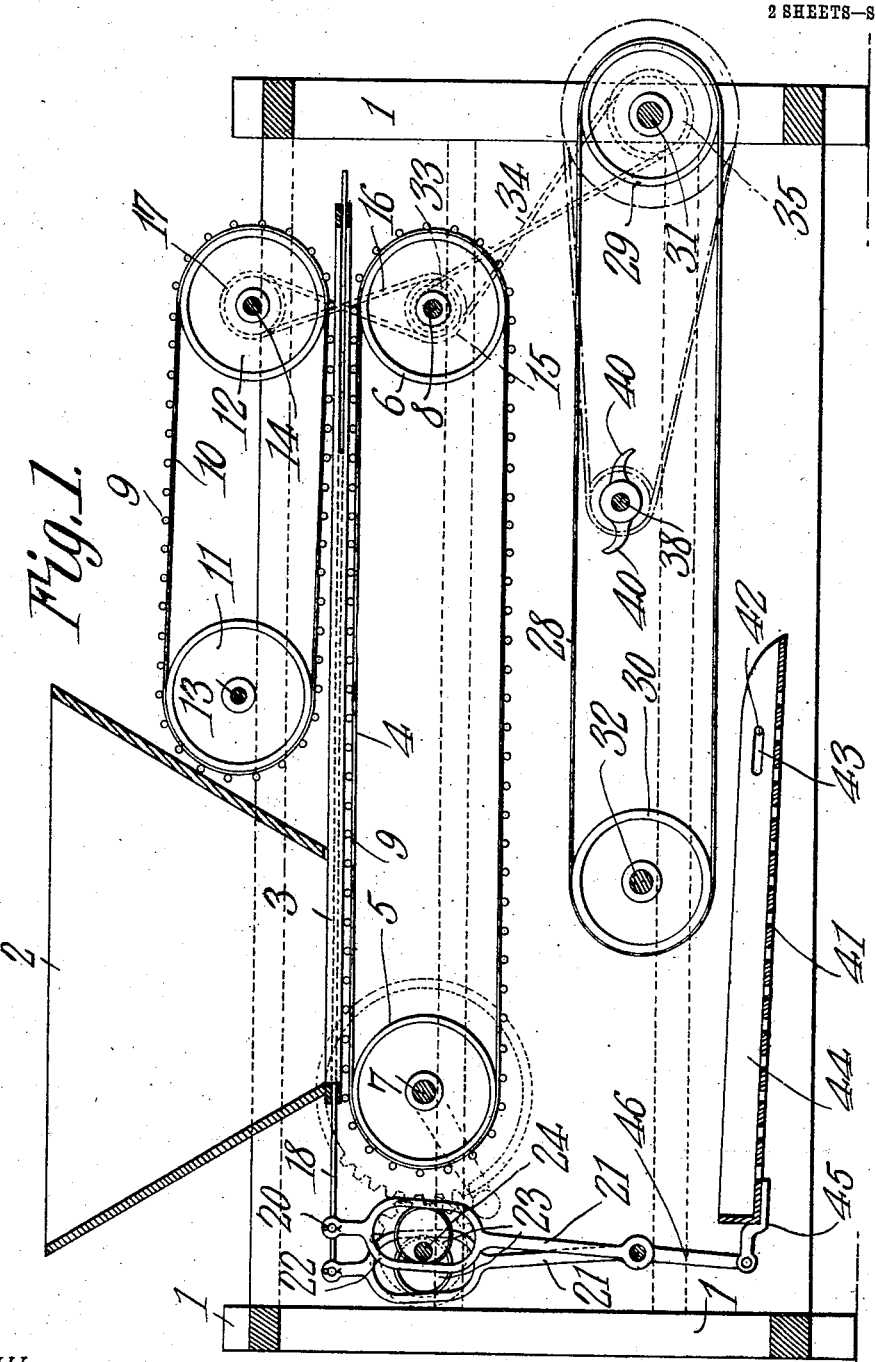

No. 883,881.

PATENTED APR. 7, 1908.

J. W. HERBERT.
CHERRY PITTING MACHINE.
APPLICATION FILED APR. 15, 1907.

2 SHEETS—SHEET 1.

WITNESSES:

Joseph W. Herbert, INVENTOR.

By C. A. Snow & Co.,
ATTORNEYS

No. 883,881.
PATENTED APR. 7, 1908.
J. W. HERBERT.
CHERRY PITTING MACHINE.
APPLICATION FILED APR. 15, 1907.
2 SHEETS—SHEET 2.
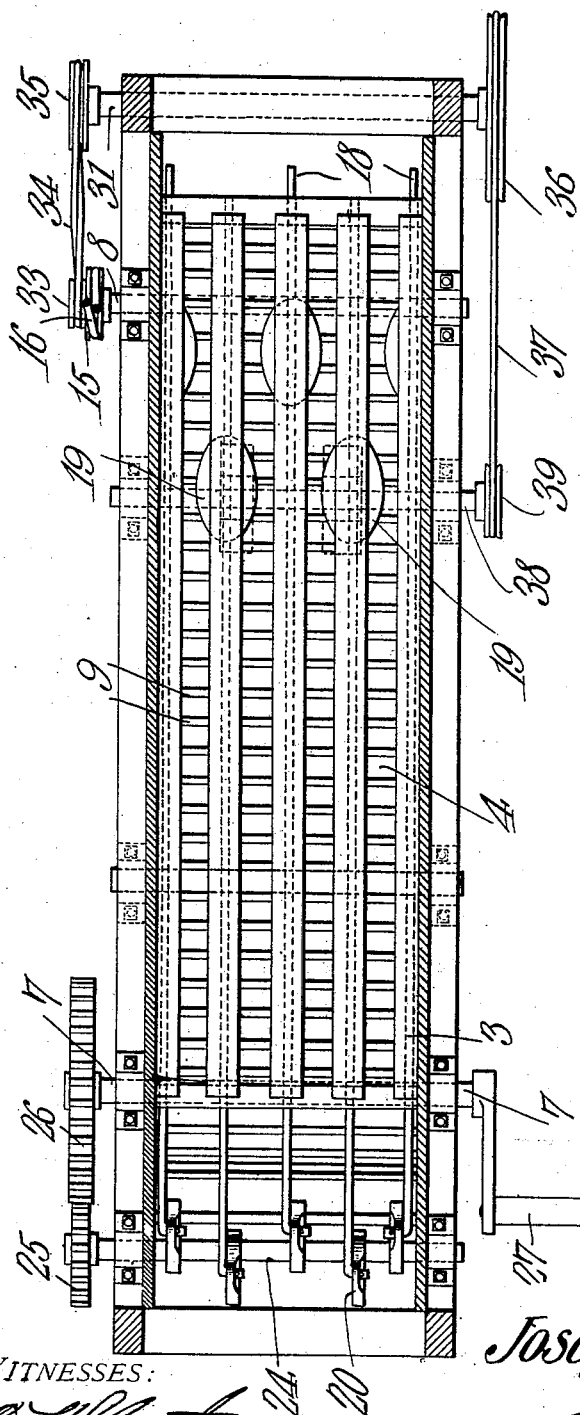
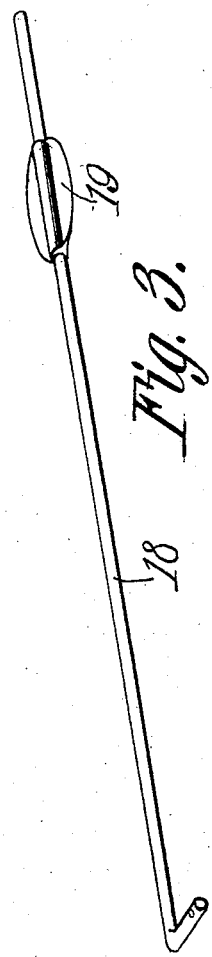
Fig. 2.
Fig. 3.
WITNESSES:
Joseph W. Herbert,
INVENTOR
By C. A. Snow & Co.
ATTORNEYS

UNITED STATES PATENT OFFICE.

JOSEPH WALTER HERBERT, OF LOS GATOS, CALIFORNIA.

CHERRY-PITTING MACHINE.

No. 883,881.　　　　Specification of Letters Patent.　　　Patented April 7, 1908.

Application filed April 15, 1907. Serial No. 368,239.

*To all whom it may concern:*

Be it known that I, JOSEPH W. HERBERT, a citizen of the United States, residing at Los Gatos, in the county of Santa Clara and State of California, have invented a new and useful Cherry-Pitting Machine, of which the following is a specification.

This invention has reference to improvements in cherry pitting machines, and its object is to provide a machine that will extract the pits from the cherries without crushing the pulp of the cherries.

The invention consists essentially in a suitable hopper in which the cherries to be treated are placed and from which they pass to a conveyer and are carried by said conveyer past reciprocating knives arranged to cut through the cherry pulp to the pit. The cherries so cut are deposited upon a conveyer and there subjected to knocks or shocks sufficient to cause the pits to be dislodged from the pulp through the cuts, and from this conveyer the mixture of pitted cherries and pits is deposited upon a screen having apertures of such size that the pits fall through them easily, while the cherries minus the pits will be carried by said screen to a point where they may fall into a suitable receptacle.

By the use of a machine of this character practically all of the juices of the cherries are retained and the pitted cherries are thus of as great value for eating as are unpitted cherries, while the useless pits are discarded.

The invention will be fully understood from the following detailed description taken in connection with the accompanying drawings forming part of this specification, in which,—

Figure 1 is a longitudinal section, with parts in elevation, of the improved cherry pitting machine; and Fig. 2 is a plan view of the same, with parts in section. Fig. 3 is a perspective view of one of the knives.

Referring to the drawings, there is shown a suitable framework 1 which may be of any desired shape and construction adapted to the purposes for which the machine is to be used. At the top the framework carries a hopper 2, which also may be of any suitable construction and of sufficient size to contain a large number of cherries. The bottom of this hopper is covered by a number of longitudinal strips 3, so spaced as to receive between them the cherries that may be placed in the hopper 2. The strips extend beyond one side of the hopper to a sufficient distance for the purposes of the invention, and below these strips there passes a conveyer belt 4 traveling over a drum 5 at one end and another drum 6 at the other end, these drums being carried upon shafts 7 and 8 respectively, journaled in the framework of the machine near the ends thereof. The conveyer belt 4 is provided with lateral slats 9, spaced apart at the proper distance to readily receive cherries between them. These slats may be of any suitable material or may be in the form of steel rods with their ends running in grooves in guide strips at the sides of the machine.

Over that portion of the conveyer belt 4 after it leaves the hopper 2 until it reaches the drum 6 there is another conveyer belt 10, also having slats 9 and carried by drums 11—12 mounted on shafts 13 and 14 respectively, which shafts are suitably journaled in the framework of the machine. The shaft 8 extends beyond one end of the machine and there carries a pulley 15 from which extends a belt 16 to another pulley 17 on the shaft 14. This belt 16 may be crossed so that the matching faces of the conveyer belts 4 and 10 may travel in the same direction, and these belts are so spaced as to confine cherries between their slats without crushing but in such manner as to prevent them from accidentally escaping. The strips 3 have rods 18 extending longitudinally therethrough and at points near the limit of travel of the conveyer belts these strips are slotted for the passage of knives 19 extending on each side of the strips 3 into the spaces between the contiguous faces of said strips and between the conveyer belts 4 and 10 near the points where they pass over the respective rollers 6 and 12.

The rods 18 at the ends remote from the knives are pivotally connected to eyes 20 in the upper ends of levers 21. These levers are split near their upper ends to form long yokes 22 in which engage cams 23 fast on a rotary shaft 24 suitably journaled in the framework of the machine. This shaft 24 extends beyond one side of the framework and there carries a pinion 25 meshing with a gear wheel 26 on the corresponding end of the shaft 7, and the other end of this shaft 7 may have secured to it a manipulating handle 27. The cams 23 are arranged to have their longer radii alternately on opposite sides of the axis of the shaft 24 so that when one lever 21 is moved by a cam about its pivot in one direction, the next adjacent lever will move about its pivot in the opposite direction. Therefore, when the shaft 24 is rotated each knife 19 is oppositely reciprocated from the next adjacent knife 19. Now, when the handle 27 is turned in a direction to cause the conveyer 4 to travel from the hopper toward the knives, cherries contained in the hopper will be carried by the belt in parallel series until they are presented to the knives 19. Before, however, they reach these knives, they are engaged by the belt 10 and therefore the knives are enabled to cut through the pulp without disturbing the progress of the cherries toward the discharge end of the conveyer 4. Below the discharge end of the conveyer 4 there is another conveyer 28 consisting of a plain endless belt passing over drums 29 and 30 mounted upon shafts 31 and 32 respectively, which shafts are suitably journaled in the framework of the machine. The shaft 31 receives motion from a pulley 33 on the shaft 8 by means of a cross belt 34 extending over a pulley 35 on the corresponding projecting end of the shaft 31. The other end of this shaft 31 carries another pulley 36 giving motion by means of a belt 37 to another shaft 38 through the intermediary of a pulley 39 on the last named shaft. This shaft 38 is suitably journaled in the machine, and extends beneath the upper member of the belt 28 at a suitable distance below the same. The shaft 38 carries oppositely projecting tappet fingers 40 so arranged that when the shaft 38 is rotated in the proper direction these fingers will engage the under surface of the upper member of the belt 28 in rapid succession, and the cut cherries which have been directed to this belt from the delivery end of the conveyer 4 are subjected to knocks or shocks sufficient to dislodge the pits that remain in the cut pulp of the cherries.

Below the delivery end of the belt 28 there is a flat screen 41 arranged for longitudinal movement and supported in the framework at one end by means of studs 42 extending through slots 43 in the sides 44 of said screen. At the other end the screen is provided with one or more brackets 45 connected to downward extensions 46 of one or more of the levers 21. Where more than one downward extension 46 of the levers 21 is utilized, these extensions will come from those levers moving in the same direction.

The pitted cherries and the pits that have been dislodged therefrom are delivered by the belt 28 on to the screen 41, which latter is constantly reciprocated by the extension or extensions 46 of the levers 21. This shaking action of the screen 41 will cause the pits to fall through the perforations in the bottom of the screen where they may be deposited in any suitable receptacle, while the pitted cherries will find their way over the end of the screen into a vessel provided for their reception.

When it is desired to operate the machine on a large scale the handle 27 will, of course, be replaced by suitable means for the application of power.

It will be seen that each cherry is individually operated upon but at the same time a large quantity of cherries may be treated in a comparatively short time, and the loss of juice will be practically negligible since but little, if any, will be lost because of the cutting of the cherry pulp by the knives 19. The cherries are so little damaged by the machine as to retain all the characteristics of whole cherries with the added advantage that the inedible pits are eliminated.

I claim:—

1. A cherry pitting machine comprising a suitable hopper, conveyers for carrying the cherries in longitudinal series, each cherry being individually grasped, reciprocating knives past which the conveyers carry the cherries and by which the pulp of the cherries is cut, and means for separating the cherry pits from the pulp.

2. A cherry pitting machine comprising a suitable hopper, a number of guideways extending from the delivery end of the hopper, conveyers movable on opposite sides of said guideways, knives working in the spaces between the guideways to engage and cut the pulp of the cherries, and means for separating the cherry pits from the cut pulp.

3. A cherry pitting machine comprising a suitable hopper, guideways extending from the delivery end thereof, a conveyer belt having slats suitably spaced to receive cherries separately between them and constituting the bottoms of said guideways, another conveyer belt engaging the cherries after they leave the hopper and constituting the top of the guideways, and reciprocating knives within said guideways for cutting the pulp of the cherries.

4. A cherry pitting machine comprising a suitable hopper, conveyer belts between which the cherries are each separately grasped, means for cutting the pulp of said cherries, a conveyer belt upon which the cut cherries are delivered, and means for delivering blows to the last-named belt to cause the separation of the pits from the cut pulp.

5. A cherry pitting machine comprising means for cutting the pulp of the cherries, a conveyer belt upon which the cut cherries are delivered, and means for agitating said belt to cause the dislodgment of the pits from the cut pulp.

6. A cherry pitting machine comprising means for cutting the pulp of the cherries, a conveyer belt upon which the cut cherries are delivered, means for agitating the conveyer belt to cause the dislodgement of the pits from the cut pulp, and a screen upon which the pitted cherries and dislodged pits are delivered for separating the pits from the mass of pitted cherries.

7. A cherry pitting machine comprising a suitable hopper, conveyer belts, guides coacting therewith to cause the belts to grasp each cherry separately, reciprocating knives between the cherry-guides, and means for causing the reciprocation of the knives comprising levers, each connected to a knife, oppositely located cams engaging said levers, a shaft carrying said cams, and connections between said shaft and the drive member of the machine.

8. A cherry pitting machine comprising a suitable hopper, conveyer belts for carrying cherries away from said hopper, reciprocating knives arranged in the path of the cherries, means for reciprocating said knives, another conveyer belt upon which the cherries after passing the knives are delivered, rotating tappets engaging said last-named belt for agitating the same to cause the dislodgement of the pits from the cut cherries, and a reciprocating screen receiving the pitted cherries and dislodged pits for separating the pits from the mass of pitted cherries.

In testimony that I claim the foregoing as my own, I have hereto affixed my signature in the presence of two witnesses.

JOSEPH WALTER HERBERT.

Witnesses:
   CHAS. H. NOBLE,
   J. G. FITCH.